United States Patent [19]
Jenkins

[11] Patent Number: 5,911,939
[45] Date of Patent: Jun. 15, 1999

[54] APPARATUS AND METHOD FOR PREPARING CYLINDRICAL SURFACES

[75] Inventor: Peter David Jenkins, Framlingham, United Kingdom

[73] Assignee: Miniflex Limited, United Kingdom

[21] Appl. No.: 08/750,841
[22] PCT Filed: Jun. 16, 1995
[86] PCT No.: PCT/GB95/01415
   § 371 Date: Dec. 17, 1996
   § 102(e) Date: Dec. 17, 1996
[87] PCT Pub. No.: WO95/35196
   PCT Pub. Date: Dec. 28, 1995

[30] Foreign Application Priority Data

Jun. 17, 1994 [GB] United Kingdom ............... 9412236

[51] Int. Cl.⁶ .................................................. B29C 43/46
[52] U.S. Cl. .............. 264/286; 264/288.8; 264/289.3; 264/310; 425/329; 425/336; 425/392; 425/396
[58] Field of Search ............... 264/288.8, 289.3, 264/310, 286, 287; 425/392, 396, 294, 336, 329

[56] References Cited

U.S. PATENT DOCUMENTS

| | | | |
|---|---|---|---|
| 3,323,339 | 6/1967 | Mattil | 72/78 |
| 3,692,889 | 9/1972 | Hetrich | 264/92 |
| 3,818,735 | 6/1974 | Grob et al. | 72/78 |
| 4,043,161 | 8/1977 | Toma et al. | 72/78 |
| 5,473,723 | 12/1995 | Stockman et al. | |

FOREIGN PATENT DOCUMENTS

| | | |
|---|---|---|
| 1524099 | 4/1968 | France . |
| 986226 | 3/1960 | United Kingdom . |
| 896163 | 5/1962 | United Kingdom . |

*Primary Examiner*—Jill L. Heitbrink
*Assistant Examiner*—Mark Eashoo
*Attorney, Agent, or Firm*—Howell & Haferkamp, L.C.

[57] ABSTRACT

An apparatus for forming grooves in the cylindrical surfaces of tubes or rods has a passage through the apparatus with a grooving roller mounted adjacent the passage. The roller has a helically extending ridge formed on its circumference, with the ridge extending into the passage and the roller being mounted for rotation about an axis inclined to the axis of the passage. The angle of inclination of the axis is such that the ridge, where it extends into the passage, runs at right angles to the axis of the passage. The roller is made to rotate about the tube or rod as the tube passes through the apparatus.

24 Claims, 4 Drawing Sheets

APPARATUS AND METHOD FOR PREPARING CYLINDRICAL SURFACES

This invention relates to apparatus for preparing cylindrical surfaces, for example the surfaces of tubes or rods, and in particular to apparatus for processing a plastics tube or rod which has an initially smooth external wall to produce a tube or rod which has an external wall formed with annular grooves.

A tube of this type is particularly suitable for use as a bend limiting tube for sheathing optical fibres, and the structure and use of such a tube is described in my international patent application, publication number WO 93/09457.

It is known from GB-A-O 896 163 to corrugate a thin-walled aluminium tube, to grip a cable core running through the tube. This corrugating can be done by passing a plain walled tube containing a cable core through a corrugating head.

For the purposes of the present invention, there is no restriction on the end use to which the tube or rod may be put. Although this specification describes particularly the preparation of a tube surface, it will be obvious to the skilled man that a rod surface could be prepared in the same way.

According to the present invention, there is provided apparatus for forming parallel grooves in the outer wall of a smooth-bore tube, the apparatus comprising a grooving roller mounted adjacent a passage through the apparatus, the roller having a helically extending ridge formed on the circumference thereof, the ridge extending into the passage and the roller being mounted for rotation about an axis inclined to the passage such that the ridge, where it extends into the passage, runs at right angles to the axis of the passage, means for, in use, rotating the roller about a tube in the passage, and feed means for drawing the tube from the passage under tension so as to stretch the tube as the grooves are formed in the tube outer wall.

The term 'ridge' used in this specification extends to any formation which is raised above a surface of the grooving roller, to indent the surface of a cylindrical object in the passage.

By constructing the groove-forming ridges, and by inclining the roller in this way, it becomes possible to continuously form a series of annular grooves in the surface of a tube as it travels through the apparatus.

There may be more than one helically extending ridge formed on the surface of the grooving roller. Where there is only one grooving roller, each ridge must extend through an arc of length at least equal to the circumference of the cylindrical surface.

It may be possible to provide more than one grooving roller and, for example, three grooving rollers could be provided around the passage. In this case, each roller could form one-third of the circumferential length of each groove. In practice however each roller would form more than one-third of the circumference so that the individually formed groove segments would overlap and properly merge into one another. Where there are a number of grooving rollers, it is no longer necessary for each ridge to have a circumferential length at least equal to the circumference of the cylindrical surface.

It is not intended that the grooves should be formed by cutting of the tube wall material; rather that the grooves should be formed by compressing and to an extent redistributing the material of the tube wall. The cross-sectional profile of the ridges therefore preferably is of an arch-like shape, with the apex of the arch having a radius of about 0.3 mm minimum. In a preferred form, the arch shape is a gothic arch shape.

The passage through the aperture is preferably defined in part by the cylindrical faces of two back-up rollers mounted on axes parallel to the axis of the tube passage, and with their circumferences tangential to the edge of the passage. The grooving rollers and two back-up rollers are preferably spaced 120° apart around the passage. The back-up rollers preferably have smooth outer surfaces. Where there are three grooving rollers as discussed above, the back-up rollers can be replaced by the second and third grooving rollers, with the additional grooving rollers being set relative to the passage in the same way as the first-mentioned roller.

The apparatus may include a tube guide upstream of the grooving roller to provide an initial compression of the tube material before it enters engagement with the grooving roller. This guide can be formed by a backward, cylindrical extension of the grooving roller itself, in combination with an axial length of the back-up rollers so that they combine with the extension of the grooving roller to grip and compress the tube before the tube makes contact with the ridge on the grooving roller. The backward, cylindrical extension preferably has a radius which is slightly less than that of the crest radius of the helically extending ridge. Preferably the radius of the extension is smaller than the radius of the ridge by the depth of the groove to be formed in the surface.

The apparatus preferably includes a body with a tubular passage therethrough and on which the grooving roller and the back-up rollers are mounted, with the grooving and back-up rollers being mounted for free rotation about their axes, the apparatus also including means for driving the body in rotation about the axis of the tubular passage. The apparatus also includes means to prevent the tube itself from rotating as it passes through the apparatus.

A temperature control stage, to either heat or cool the tube before it enters the passage, may be provided. Cooling may be necessary if the apparatus is positioned, as is envisaged, directly downstream of a tube extrusion machine. The action of the ridge in forming a groove in the surface of a tube can be enhanced by ensuring that the tube material is at the optimum temperature. The optimum temperature is likely to be different for different tube materials.

The means for driving the body may comprise a toothed ring around the body, driven by a belt or gear drive from a parallel-mounted driven sprocket or toothed wheel.

Feed means may be provided to allow the tube to enter the apparatus at a controlled rate, and to gather up the prepared tube as it exits the apparatus. The teed means (either on the tube entry side or on the tube exit side of the apparatus) can be used to prevent rotation of the tube in the apparatus. It is preferable and advantageous to stretch the tube slightly as the grooves are formed. The necessary tension can be placed in the tube by the feed means on the tube exit side of the apparatus. It is also within the scope of the invention to prepare the outer surface of a thin-walled tube using this apparatus. It may then be necessary to pressurise the interior of the tube to force the tube walls to conform to the shape of the groove-forming ridges on the roller(s).

The invention also provides a method of forming parallel grooves in the outer wall of a smooth-bore tube, the method comprising the steps of passing the tube along a passage, with a grooving roller being mounted adjacent the passage, the roller having a helically extending ridge formed on the circumference thereof, the ridge extending into the passage and the roller being mounted for rotation about an axis inclined to the passage such that the ridge, where it extends into the passage, runs at right angles to the axis of the passage, causing the roller to rotate about the tube so that the ridge on the grooving roller presses into the tube wall and forms grooves therein, and stretching the tube as it leaves the grooving roller so as to stretch the tube as the grooves are formed in the tube wall.

The invention will now be further described, by way of example, with reference to the accompanying drawings, in which.

Figure 1A:
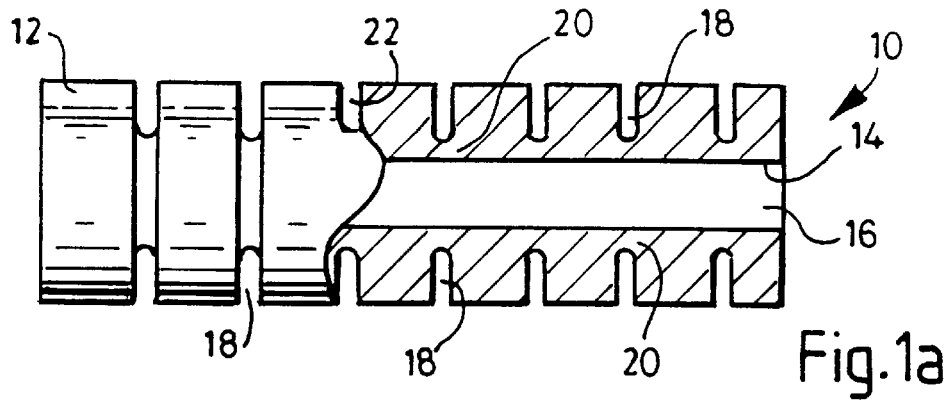
FIG. 1a shows a short section of a first form of tubing which has been prepared using the apparatus in accordance with the invention.

The sheathing 10 shown in FIG. 1 is extruded, as a plain-walled tube, from a plastics material such as polypropylene. The tube has an outer wall 12 and an inner wall 14 which defines an internal bore 16.

A plain-walled tube can be bent to virtually any radius and the amount of applied force necessary to do this bending, especially as the radius of curvature becomes smaller, increases progressively and steplessly up to the point at which the tube wall kinks and the tube cross-section collapses. In order to prevent over bending of an optical fibre located in the bore 16, a plain-walled tube is modified so that the tube can be bent up to a pre-determined radius by application of a relatively low force, but can only be bent beyond this radius, if at all, by application of a significantly higher force. To achieve this, the outer wall 12 of the tube is formed, subsequent to extrusion, with annular grooves 18. The grooves are formed primarily by locally compressing the wall material, although it is within the scope of the invention for the grooves to be formed by cutting of the wall material.

Figure 1B:
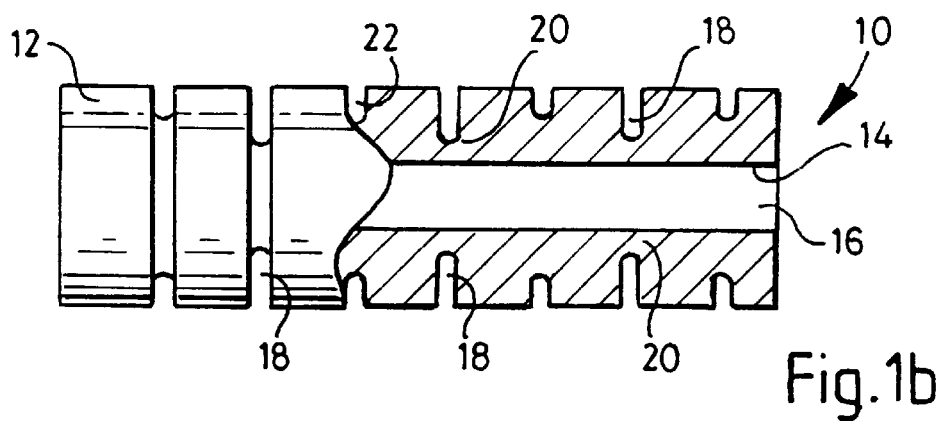
FIG. 1b shows a short section of a second form of tubing which has been prepared using the apparatus in accordance with the invention.

FIG. 1a shows a tube where all the grooves 18 are of equal depth; FIG. 1b shows a tube where the grooves 18 are alternately deeper and shallower.

Figure 2:
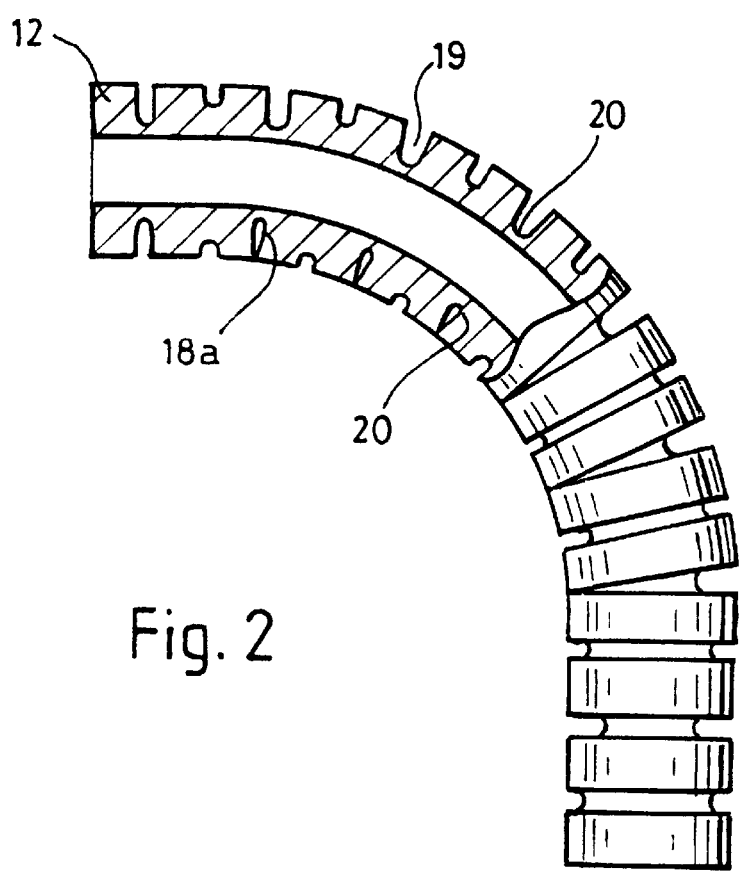
FIG. 2 shows the tubing of FIG. 1b after having been bent to its pre-determined minimum radius.

The function of the grooves 18 is best illustrated in FIG. 2 from which it can be seen that on the inner side of the curve, the grooves 18a close up and the peripheral edges of the grooves come into contact to limit further bending. On the outer side of the curve, the grooves open up as shown at 19. Up to this point, bending takes place by flexing "hinges" 20 formed by the material remaining at the bases of the grooves 18. Beyond this point, application of extreme force can result in further bending but when this happens, there will be distortion of the plastics material.

One of the desirable results of forming the grooves by compressing the wall material is that the "hinges" 20 will be formed of heavily compressed plastics material which will be more dense locally than the surrounding plastics and in this dense area there will be some advantageous alignment of polymer chains. This process is assisted by stretching the tube during the groove-forming process.

Figure 3:
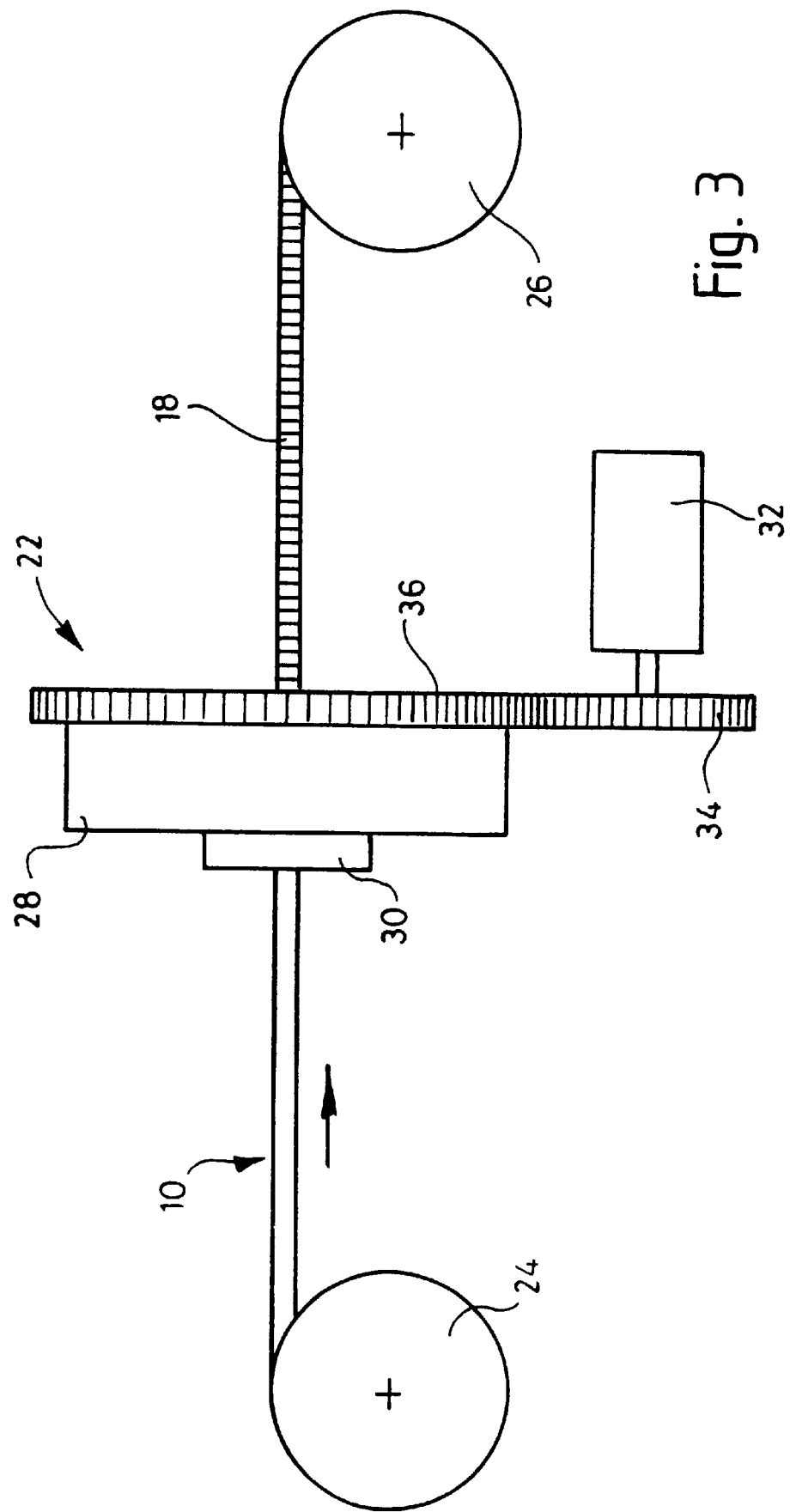
FIG. 3 is a schematic view of the apparatus according to the invention.
Figure 4:
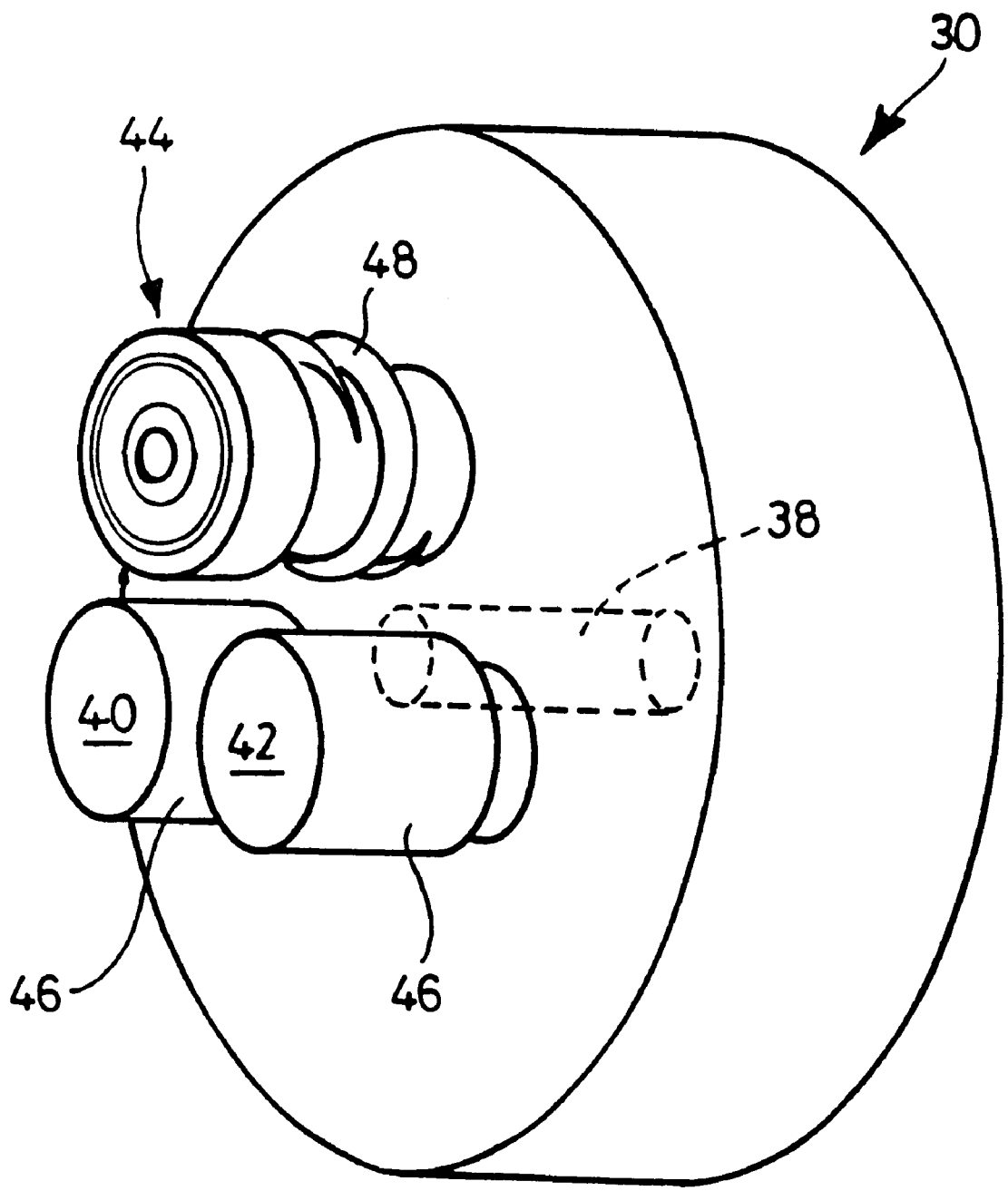
FIG. 4 is a perspective view from one end of part of the apparatus of FIG. 3.
Figure 5:
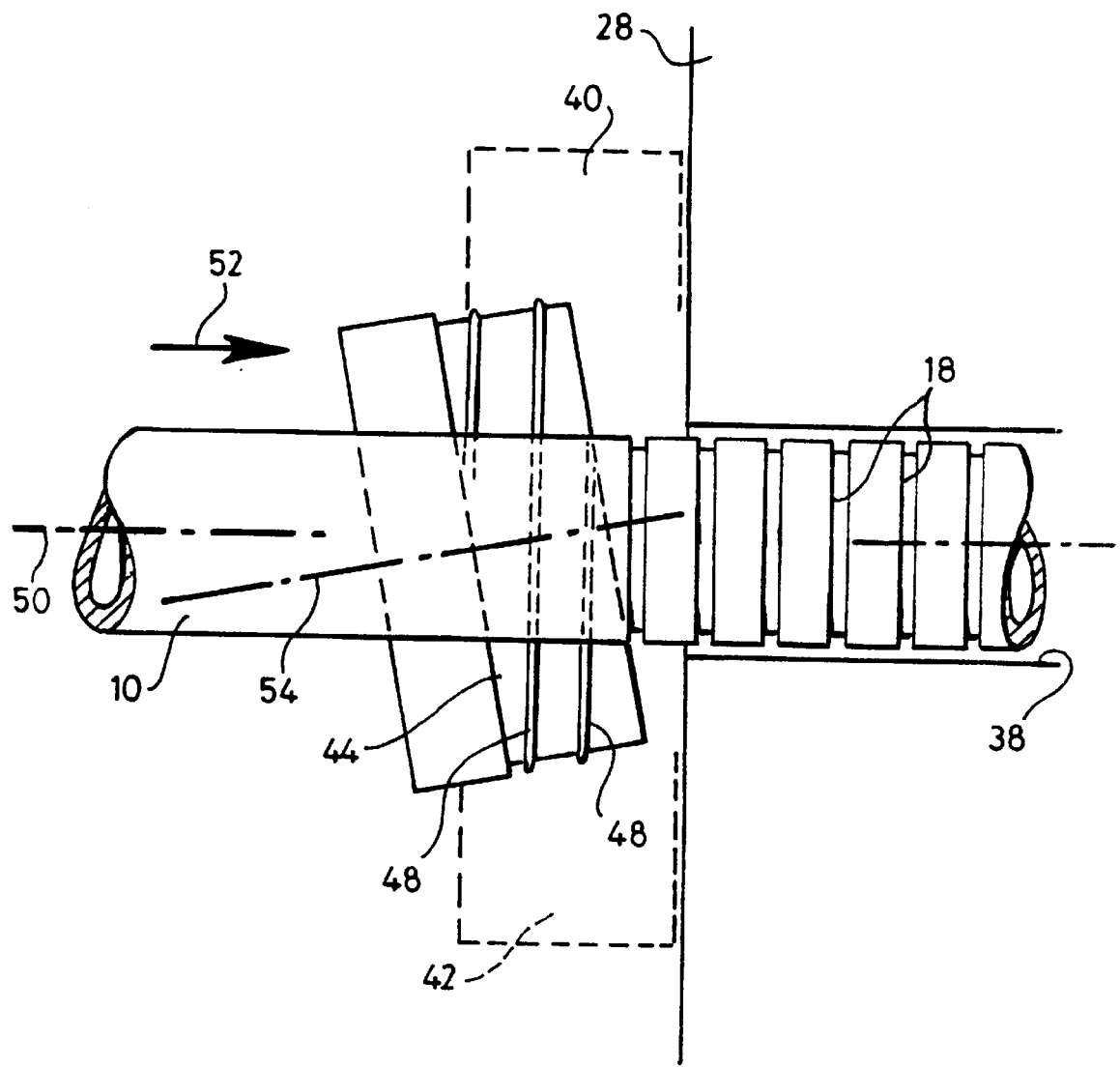
FIG. 5 is another detailed view showing part of the apparatus of FIG. 3.

The apparatus now to be described with reference to FIGS. 3, 4 and 5 is effective to modify an initially plain-walled, extruded tube by forming grooves 18 in the wall thereof. Successful trials have been carried out on tubes of polypropylene, polybutylterephthalate- (PBT), nylon, polyethylene and plastics which are blends of PBT and acrylonitrilebutadienestyrene (ABS).

FIG. 3 shows the apparatus generally designated 22 with a length of tubing 10 passing through it from a feed reel 24 to a take-up reel 26. It will be seen that the tubing 10 to the left hand side of the apparatus 22 is plain-walled whereas the tubing emerging from the apparatus on the right hand side is formed with grooves 18.

It may be possible to place the apparatus 22 directly downstream of an extrusion machine by which the tube is formed, so that the extrusion machine replaces the feed reel 24, and controls the speed at which the tube 10 enters the apparatus 12.

The take-up reel 26 may also take any other convenient form but it is desirable that whatever equipment is used to gather up the prepared tube is able to exert some tension on the tube as it is being drawn through the apparatus 22. There may be a separate draw-off component to pull the tube through the apparatus 22 and to pass the tube to the take-up reel.

The radius of any reels 24, 26 used for collecting or dispensing the tube must have a radius greater than the designed minimum bend radius of the tube.

The apparatus 22 comprises a body 28 with a grooving unit 30 on the intake side of the body. The body 28 will be supported in a fixed structure, not shown, and is driven for rotation about the axis of the tube 10 by means of a motor 32 which drives a pinion 34, the pinion 34 being in engagement with a pinion 36 on the external surface of the body 28.

The skilled man will appreciate that many alternative methods of rotating the body 28 could be used, for example a belt drive could connect a motor 32 with the body.

The grooving unit 30 and the body 28 both have an axial passage through them, to allow the tube 10 to pass through. In the grooving unit, the passage walls are formed by the roller surfaces; in the body the passage walls are formed by the internal surface of a bore 38.

FIG. 4 shows the grooving unit 30 mounted on the face of the body 28, and this figure also shows in dotted lines the axial bore 38 through the body 28 which allows the tube through.

The grooving unit 30 consists of three rollers 40, 42 and 44. These rollers are mounted with their axes 120° apart. There is a slight gap between the circumferences of the rollers where they approach one another, so that the rollers are not in contact with one another.

The rollers 40 and 42 have plain cylindrical surfaces 46, and these rollers, which form part of the passage walls, are mounted in bearings for free rotation about axes parallel to the axis of rotation of the body 28.

The grooving roller 44 however, has groove-forming ridges formed on its cylindrical surface. The grooving roller is also mounted for free rotation in appropriate bearings in the body 28, but the axis of rotation 54 of the roller 44 is inclined to the passage 38 and to the axis of rotation of the body 28.

The roller 44 has a cylindrical extension 56 which is in a position upstream of the grooving ridge 48 of the roller. This extension works together with the upstream ends of the idler rollers 40 and 42 to form 'hip' in which the tube is initially received. A small degree of radial compression takes place in this nip, and the tube is therefore held and supported as it comes into contact with the grooving ridge 48. When the tube comes into contact with the ridge 48, it has grooves 18 formed into its surface as it passes through the rollers 40, 42 and 44, in a manner which will be described now with reference to FIG. 5.

In FIG. 5 the axis of the apparatus is indicated at 50. This axis is the centre of the tubular passage along which the tube 10 passes and is also the centre of rotation of the body 28.

FIG. 5 shows clearly the mounting of the roller 44 with its axis of rotation 54 at an angle of inclination to the axis 50. This angle of inclination is set so that the groove-forming ridges 48 lie at right angles to the axis 50. It will be clear from a consideration of FIG. 5 that if the roller 44 rotates about its own axis in a clockwise direction when viewed in the direction of arrow 52, the groove-forming ridges 48 will precess in the direction indicated by the arrow 52. Once the leading ridge 48 has bitten into the tube wall material, any further rotation of the roller 44 will draw the tube through the apparatus.

For the apparatus to function as designed, it is necessary firstly for the roller 44 to rotate about its own axis and secondly either for the axis of the roller 44 to rotate about the tube axis, or for the tube itself to rotate about its own axis.

In the apparatus described here, the second movement is produced by rotating the body 28 which carries the roller axis about the tube, while the tube is held against rotation. When this happens, the friction and/or the groove-forming contact between the tube and the roller causes the first movement to take place.

Although it would be possible to drive the grooving roller 44 by means of a motor connected directly to that roller, it is easier to rotate the body 28 about the axis 50 and to hold the tube 10 to prevent it rotating. The planetary motion of the rollers 40, 42, 44 around the surface of the tube 10 will produce rotation of the grooving roller and of the back up rollers to draw the tube through the apparatus. The planetary motion of the grooving roller around the surface of the tube 10 will cause a continuous set of grooves 18 to be formed in the tube wall. It is important that each ridge 48 extends around the circumference of the roller 44 for a distance equal to or greater than one complete circumference of the tube 10, for otherwise an incomplete groove 18 would be formed.

As the roller 44 rotates, the tube is supported by the back up rollers 40, 42 against radially directed forces imposed by the groove-forming ridges 48. The friction between the tube wall and these rollers causes them to rotate also.

In a preferred embodiment, the grooving roller 44 has a two-start thread, ie there will be two ridges 48, each extending around a length of arc equal to or greater than the circumferential dimension of the tube 10. The invention could however work with more than two ridges.

The different ridges 48 can be of different forms, for example different heights. The tube of FIG. 1b is formed by using a roller 44 with two ridges 48 of different heights to produce the shallower and deeper grooves 18. The ridges 48 do not have to be of a shape which forms grooves in the tube surface; exactly the same principle of operation could be used with a suitably formed grooving roller to apply any embossed pattern to a cylindrical surface.

If the tube 10 is not drawn directly from an extrusion die, it may be desirable to heat the tube before it passes through the grooving unit 30, in order to soften the plastics material.

It will be clear to the skilled man that the pitch of the groove-forming ridges 48 on the surface of the roller 44 will determine the pitch of the grooves in the tube 10 and therefore the apparatus can produce grooves at different pitches by using different rollers 44.

It is significant that the apparatus has no reciprocating components. The body 28 can therefore be accurately balanced and this allows it to be rotated at high speed with no vibration problems. This enables economic manufacturing speed for a production line to be achieved.

By way of example, a tube with grooves of 4 mm pitch produced from a grooving roller which has groove-forming ridges of length equivalent to 720° of tube circumference, will require the body to rotate 2 revolutions for each groove. Therefore to achieve 1 metre of tube the body must rotate 500 times (1000/4×2). For a production line speed of 30 m/min the body must therefore rotate at 15,000 (30×500) revolutions per minute.

The invention thus provides a simple and effective way of continuously forming a series of independent annular grooves in the surface of a tube or rod. The resulting product is particularly suitable as a bend limiting tube for use with optical fibre, since it can protect the fibres inside and prevent them being bent through too sharp a radius.

I claim:

1. A method for forming parallel grooves in the outer wall of a smooth-bore plastic tube, the method comprising the steps of:

passing the tube along a passage through an apparatus, the passage defined by passage surfaces, the passage having an axis;

mounting a grooving roller adjacent the passage through the apparatus, the grooving roller having a circumferential surface that is one of the surfaces defining the passage; arranging a helically extending ridge formed on the circumferential surface of the grooving roller to extend from the circumferential surface and to project into the passage;

mounting the roller for rotation about a roller axis which is inclined at an angle to the axis of the passage such that the ridge, where it projects into the passage, runs at right angles to the axis of the passage, rotating the roller about a tube in the passage;

compressing the tube by a compression surface extending outwardly from the circumferential surface of the grooving roller, the compression surface adapted to compress material of a wall of a tube passed through the passage before the helical ridge contacts the tube; and stretching the tube as the grooves are formed in an outer wall of the tube.

2. An apparatus for forming parallel grooves in an outer wall of a smooth-bore plastic tube, the apparatus comprising:

a plurality of surfaces defining a passage through the apparatus along which the tube can pass, the passage having an axis;

a grooving roller with a circumferential surface mounted adjacent the passage through the apparatus, the circumferential surface being one of the surfaces defining the said passage;

a helically extending ridge formed on the circumferential surface of the grooving roller, the ridge extending from the circumferential surface to project into the passage;

a compression surface extending outwardly from the circumferential surface of the grooving roller, the compression surface adapted to compress material of a wall of a tube passed through the passage before the helical ridge contacts the tube:

means for mounting the roller for rotation about a roller axis, the roller axis being inclined at an angle to the axis of the passage at an angle such that the ridge, where it projects into the passage, runs at right angles to the axis of the passage;

means for rotating the roller about a tube passed through the passage; and feed means for drawing the tube through the passage under tension so as to stretch the tube as the grooves are formed in the tube outer wall.

3. The apparatus as claimed in claim 2, wherein the helically extending ridge is one of a plurality of helically extending ridges formed on the circumferential surface of the grooving roller.

4. The apparatus as claimed in claim 3, wherein each helically extending ridge extends through an arc of length at least equal to the circumference of the smooth bore tube in the outer wall of which grooves are to be formed.

5. The apparatus as claimed in claim 3, wherein each ridge has a cross-sectional profile having an arch-like shape which defines an apex of the ridge, with the apex having a radius of about 0.3 mm minimum.

6. The apparatus as claimed in claim 2, wherein the helically extending ridge extends through an arc, the arc having a length at least equal to a circumference of the smooth bore tube to be passed through the passage.

7. The apparatus as claimed in claim 2, wherein the grooving roller is one of a plurality of grooving rollers are mounted adjacent the passage.

8. The apparatus as claimed in claim 2, wherein the ridge on the grooving roller is adapted to form a groove in the outer wall of a smooth bore tube passed through the passage by compressing material of an outer wall of the tube.

9. The apparatus as claimed in claim 8, wherein the arch shape is a gothic arch shape.

10. The apparatus as claimed in claim 2, wherein the ridge has a cross-sectional profile having an arch shape which defines an apex of the ridge, with the apex having a radius of about 0.3 mm minimum.

11. The apparatus as claimed in claim including two back-up rollers which have circumferential surfaces and which are mounted adjacent the passage with axes parallel to the axis of the passage, wherein the surfaces defining the passage through the apparatus include part of the circumferential surfaces of the two back-up rollers, and the circumferential surfaces of the back-up rollers are tangential to the passage.

12. The apparatus as claimed in claim 11, wherein the passage through the apparatus is bounded, in part, by the cylindrical surfaces of the back-up rollers.

13. The apparatus as claimed in claim 11, wherein the grooving roller and the two back-up rollers are spaced 120° apart around the passage.

14. The apparatus as claimed in claim 13, including a body with a tubular passage therethrough and on which the grooving roller and the back-up rollers are mounted, with the grooving and back-up rollers being mounted for free rotation about their axes, the apparatus also including means for driving the body in rotation about the axis of the tubular passage.

15. Apparatus as claimed in claim 14, wherein the means for driving the body comprises a toothed ring around the body, driven by a belt or gear drive from a parallel-mounted driven sprocket or toothed wheel.

16. The apparatus as claimed in claim 11, wherein the back-up rollers have smooth circumferential surfaces.

17. The apparatus as claimed in claim 2, wherein the apparatus includes a tube guide extension upstream of the grooving roller, the tube guide extension having means for providing an initial compression of a tube passed through the passage before it enters engagement with the grooving roller.

18. The apparatus as claimed in claim 17, including two back-up rollers which have circumferential surfaces and which are mounted adjacent the passage with axes parallel to the axis of the passage, wherein the surfaces defining the passage through the apparatus include part of the circumferential surfaces of the two back-up rollers, the circumferential surfaces of the back-up rollers being tangential to the passage, and wherein the tube guide is formed by an upstream, cylindrical extension of the grooving roller itself, in combination with an axial length of the back-up rollers so that they co-operate with the extension of the grooving roller to grip and compress a tube passed through the passage before the tube makes contact with the ridge on the grooving roller.

19. The apparatus as claimed in claim 18, wherein the upstream, cylindrical extension has a diameter slightly smaller than the maximum diameter of the helically extending ridge.

20. The apparatus as claimed in claim 2, including means to prevent rotation of a tube passed through the passage as the tube passes through the apparatus.

21. The apparatus as claimed in claim 2, wherein feed means is provided for controlling a tube to enter the apparatus at a controlled rate.

22. Apparatus as claimed in claim 21, wherein the feed means is also provided for preventing rotation of the tube in the apparatus.

23. Apparatus as claimed in claim 2, including means for pressurising a bore of a tube to force walls of the tube to conform to a shape of the helically extending ridge on the grooving roller.

24. An apparatus for forming parallel grooves in an outer wall of a smooth-bore plastic tube, the apparatus comprising:

a plurality of surfaces defining a passage through the apparatus for the passage of a tube, the passage having an axis;

a grooving roller mounted adjacent the passage through the apparatus, the grooving roller having an axis that is oriented at an angle relative to the axis of the passage, the grooving roller being mounted to the apparatus so that it is freely rotatable about the roller axis, the grooving roller having a circumferential surface that partially defines the passage through the apparatus;

a helical ridge extending radially outwardly from the circumferential surface of the grooving roller, the ridge dimensioned to project into the passage perpendicular to the axis of the passage;

a compression surface extending radially outwardly from the circumferential surface of the grooving roller, the compression surface adapted to compress material of a wall of a tube passed through the passage before the helical ridge contacts the tube; and rotating means for rotating the grooving roller about the tube passed through the passage.

* * * * *